April 4, 1950     F. K. FLOYD     2,502,712
ELECTRICAL TACHOMETER
Filed Feb. 1, 1945     2 Sheets-Sheet 1
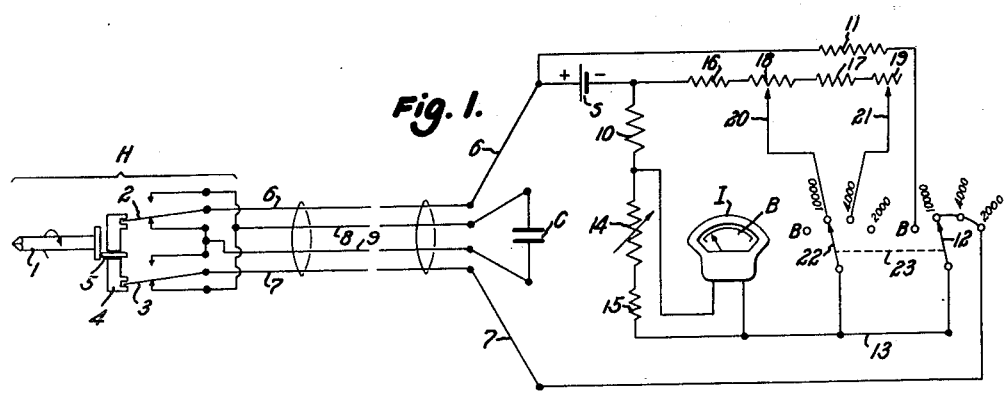
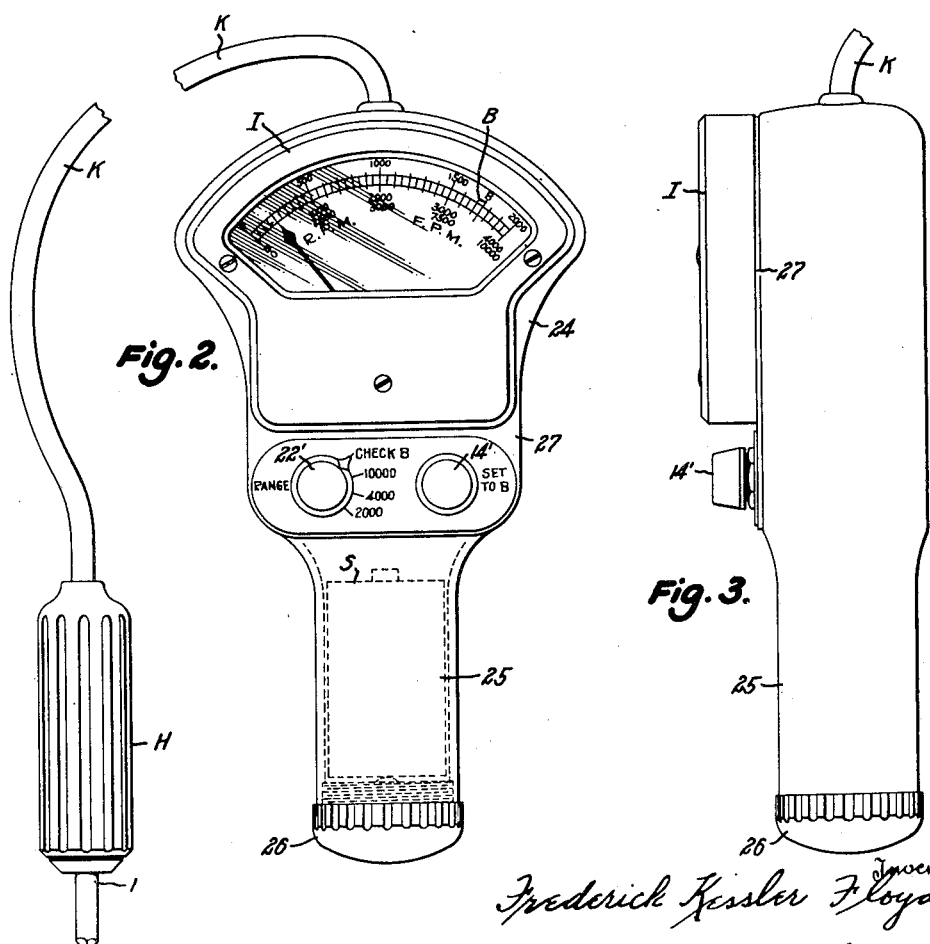
Frederick Kessler Floyd, Inventor
By Pierce + Scheffler, Attorneys

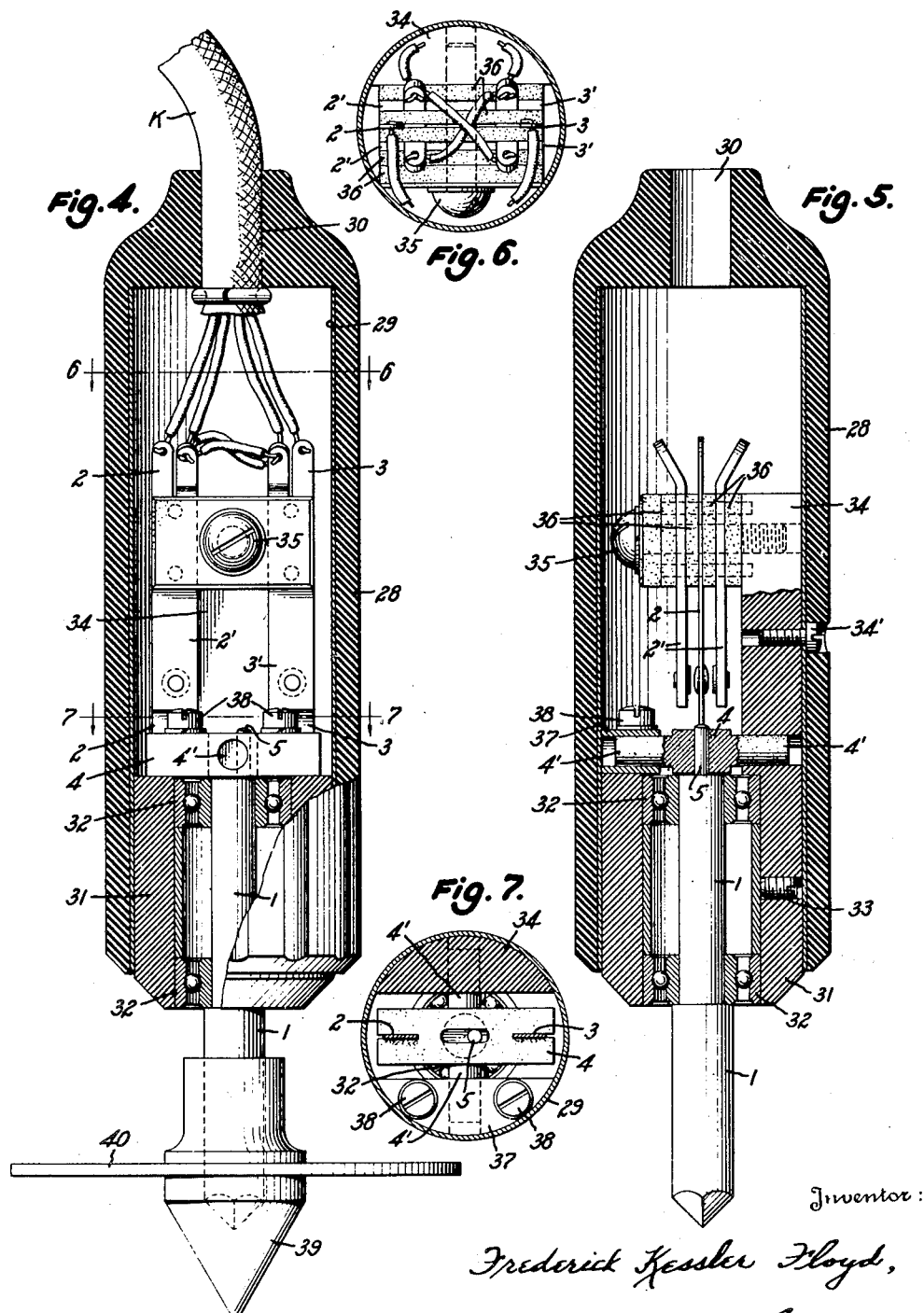

Patented Apr. 4, 1950

2,502,712

UNITED STATES PATENT OFFICE 2,502,712

ELECTRICAL TACHOMETER

Frederick Kessler Floyd, Denver, Colo., assignor to Metron Instrument Company, Denver, Colo., a corporation of Colorado Application February 1, 1945, Serial No. 575,648

4 Claims. (Cl. 175—183)

This invention relates to electrical tachometers and more particularly to tachometers of the type including a condenser in series with a direct current source and a switch that is cyclically actuated by an engine shaft or other machine part. The charging current of the condenser varies with the frequency of switch actuation, and the indicating element of the tachometer is a milliammeter for measuring the charging current.

Objects of the invention are to provide electrical tachometers of the cyclically charged condenser type that include electrical circuits of novel design with elements adjustable to compensate for variables that might affect the accuracy of the indications and/or switches of improved electrical and mechanical characteristics. An object is to provide an electrical tachometer of the stated type in which the sensitivity of the current measuring device is adjustable to compensate for any drift in the inherent sensitivity of the instrument itself and for variations in other factors such as the voltage or internal resistance of the current source. An object is to provide an electrical tachometer including a double pole, double throw switch of the spring blade type for controlling the circuit connections between the condenser, the current source and the current measuring instrument.

These and other objects, and the advantages of the invention, will be apparent from the following specification when taken with the accompanying drawings in which:

Fig. 1 is a circuit diagram of an electrical tachometer embodying the invention;

Figs. 2 and 3 are a front and a side elevation, respectively, of a small portable tachometer embodying the circuit arrangement of Fig. 1;

Figs. 4 and 5 are side elevations at right angles to each other, with parts in section, through the tachometer head; and Figs. 6 and 7 are transverse sections through the head on substantially lines 6—6 and 7—7 of Fig. 4, the outer casing of the head being omitted.

In the circuit and apparatus shown schematically in Fig. 1, the reference character C identifies the condenser that is cyclically charged in opposite sense as the polarity of its circuit connections to a current source S and a measuring instrument I, specifically a milliammeter, are reversed by a switch in the head H at a frequency determined by the rotary speed of the shaft 1. The switch includes spring blades 2, 3 movable between opposed contacts by a yoke 4 that is reciprocated by an eccentric pin 5 at the end of the shaft 1. A preferred construction of the switch and actuating spindle assembly will be described later but, for explanation of the electrical circuits, it is here sufficient to state that the switch blade 2 is connected by a lead 6 to the positive terminal of the current source S and the switch blade 3 is connected to the negative source terminal through lead 7, the instrument I and range changing circuit elements. The opposite terminals of the condenser C are connected by leads 8, 9 to the joined outer and inner contacts, respectively, of the flexible blade switches. The leads 6—9 comprise a four wire cable K connecting the head H to the current source S and the instrument I that, preferably, are mounted within a common casing.

The electrical circuit of the tachometer includes resistance network that is adjustable (a) to compensate for variables that might otherwise affect the accuracy of the measurements, and (b) to condition the tachometer for measurements in different speed ranges. Small flashlight cells are preferably employed as the current source for portable tachometers, and both the voltage and the internal resistance of the cell vary with the age of the cell and with temperature and humidity conditions. These variations affect the current through the instrument at any given speed, and the calibration check system of the present invention compensates for these changes and also for any other causes, for example aging of the permanent magnet of the instrument I, that affect the accuracy of instrument calibration.

The calibration check circuit includes a resistor 10 between the negative terminal of the current source S and the instrument I, and a resistor 11 between the positive source terminal and contact B of a multipoint rotary switch having a blade 12 connected to the other side of instrument I through the lead 13. The resistors 10, 11 adapt the milliammeter to the measurement of the voltage of the source S, and a fiducial mark "B" on the instrument scale indicates the correct pointer displacement, upon closing the check circuit, at the effective measuring sensitivity for which the speed scales of the instrument were calibrated. An adjustable resistance 14 and series resistance 15 are shunted across the instrument to adjust its sensitivity as a voltmeter to permit the calibration setting of the pointer to the mark "B." As the source voltage drops below maximum as the dry cell ages, accurate speed indications are obtained by setting switch blade 12 to contact B and adjusting resistance 14 to bring the pointer up to the mark "B." This adjustment also compensates for any variation in the inherent sensitivity of the instrument per se that may arise from aging of the permanent magnets of the instrument. The maximum value of the adjustable resistor 14 is such that the pointer cannot be brought to the mark "B" when the source voltage is less than the minimum value that may be expected to remain stable during a speed measurement.

The range adjusting network of the tachometer comprises an adjustable resistance network connected between the negative terminal of the current source S and the positive terminal of the measuring instrument I. This adjustable resistance shunt circuit is effectively connected across the millammeter I although, to avoid undue electrical damping at the higher measuring ranges, the shunt circuit is connected across the serially connected resistance 10 and instrument I. The resistance elements of the sensitivity-adjusting shunt circuit may be fixed resistances but, for calibration purposes, it is preferable to include fixed resistances 16, 17 in series with adjustable resistances 18, 19. The sliding taps of the adjustable resistance are connected, through leads 20, 21, respectively, to contact points of a switch having a contact blade 22 mechanically connected, as indicated by dotted line 23, to the blade 12 of the voltage check switch. The measuring ranges of rotary or linear speeds may have any desired values and, as a specific example of values that were satisfactory in one commercial embodiment of the invention, legends "10,000," "4,000" and "2,000" have been applied to contacts of the switch system to indicate top scale graduations for different adjustments of the range change switch.

The tachometer circuit of Fig. 1 may be manufactured in different forms and the current source S may be flashlight cells in small portable tachometers or may be a rectifier-filter system of any desired type in larger size apparatus for use in plants or shops where power is available from the usual alternating current light and power circuits. As shown in Figs. 2 and 3, the casing 24 is of hollow fan or paddle shape with an integral hollow handle 25 in which the voltage source S, a small flashlight cell, may be inserted upon removal of the threaded cap 26. The instrument I and the several circuit elements are preferably mounted on a panel 27 that is secured in place over the open front of the casing 24. Knobs 14', 22' are arranged at the lower portion of the panel 27 for manual adjustment to control the voltage calibration resistor 14 and the range changing switch blade 22, respectively.

The casing portion of the tachometer head H comprises a sleeve 28 of soft rubber molded upon a tubular metal shell 29, the inner end of the sleeve being of reduced diameter and having a bore 30 in which the cable K has a snug fit. The shaft 1 and the reversing switch are supported on a base having an outer tubular portion 31 within which the shaft 1 is rotatably supported by ball bearings 32 that are fixed in place by a set screw 33. The inner portion 34 of the base is of segment shape in cross-section and with the outer portion 31 fits snugly within the shell 29, being retained therein by cap screw 34'. The segmental portion 34 provides a face against which the flexible switch blades 2, 3 and their opposed relatively rigid blades 2', 2' and 3', 3' respectively. are mounted by a screw 35 and insulating spacer strips 36. The switch blades are provided with the usual contact lugs of a noble metal or alloy that affords good contact closures.

The forward ends of the switch blades 2, 3 extend into slots of the yoke 4 that has cylindrical extensions 4' smoothly engaging cylindrical guide openings in the base section 34 and in a segmental block 37 that is secured to the rear of the cylindrical base section 31 by bolts 38. The axes of the cylindrical guide extensions 4' are in a plane normal to that of the resilient switch blades 2, 3, and they thereby limit the movement of the yoke 4 by shaft 1 and eccentric pin 5 to a reciprocation at right angles to blades 2, 3.

As shown in Fig. 4, a tip 39 carrying a disk 40 having a circumferential length of exactly one foot can be detachably mounted on the shaft 1 of the tachometer head to adapt the apparatus for the measurement of linear speeds in values of feet per minute.

Before making a measurement of rotary or linear speed, the calibration of the tachometer is checked by adjusting the switch knob 22' to the legend "Check B," thereby adapting the instrument I for operation as a voltmeter. If the instrument pointer does not aline with the fiducial mark "B" of the scale plate, the knob 14' is turned to adjust resistance 14 to obtain the desired alinement. It is to be noted that this adjustment differs from the usual practice in the calibration of electrical measuring apparatus as it does not alter the source voltage but adjusts the sensitivity of the instrument I, when subsequently operated as a milliammeter, to the voltage of the current source. After calibration, the switch knob 22' is set to the legend indicating the desired measurement range and the top of shaft 1, or the flange of the "one foot" disk 40, is pressed against the moving machine part. The condenser C is reversely charged at a frequency that varies with the cyclic operation of the reversing switches by the shaft 1 and yoke 4, and the current through the instrument I therefore varies with the speed of the machine part.

The described apparatus is of high accuracy and affords "repeatable" readings as the reversing switch assembly substantially eliminates the difficulties from the erratic switch closures and varying contact resistances that were characteristic of priror condenser-charging tachometers in which the switches were of the rotating contact segment and spring-pressed brush type. The spring blades 2, 3 are positively actuated by the yoke 4 and good contact engagements are therefore obtained even at the highest speeds and in spite of mechanical resonance of parts subject to vibration. When springs are relied upon to effect contact engagements, as in the prior devices, the contact closures are uncertain and are particularly erratic in the speed ranges that set up vibrations in the region of the natural vibration period of the springs.

It is to be understood that the invention is not limited to the embodiment herein illustrated and described as various changes that may occur to those familiar with the design and construction of electrical measuring apparatus fall within the spirit of my invention as set forth in the following claims.

I claim:

1. In a direct-reading electrical tachometer, the combination with a source of direct current, a condenser, a milliammeter having a pointer movable along a scale graduated in speed values, and circuit elements connecting said condenser in series with said milliammeter and said current source, said circuit elements including polarity reversing switch means for cyclically reversing the direction of the current established by said source through said condenser at a frequency varying with the speed to be measured while maintaining unidirectional flow of said current through said milliammeter, of an adjustable resistance shunt circuit across said milliammeter for regulating the sensitivity thereof, and circuit means including a manually adjustable switch for connecting said source and said milliammeter in a direct current test circuit, said milliammeter scale having a fiducial mark thereon to which the pointer may be set by adjustment of the effective resistance of said shunt circuit, the graduations of said scale being correct for speed measurements upon adjustment of the shunt circuit resistance to aline the pointer with the fiducial mark.

2. In a direct-reading electrical tachometer of the current-charged condenser type, a source of direct current, a condenser, a polarity reversing switch connected between said current source and said condenser, a milliammeter in series circuit with said condenser and said direct current source to measure the current charge of said condenser, and means including a resistance network and manually adjustable switch means for connecting the same across said milliammeter to adapt the same for speed measurements in different ranges; said polarity reversing switch comprising a pair of flexible spring blades between opposed relatively stationary contacts, a reciprocating yoke for moving said spring blades into engagement alternately with their opposed contacts, and a shaft having an eccentric drive connection to said yoke.

3. A direct-reading electrical tachometer of the type including a direct current source, a condenser, a polarity reversing switch for connecting said condenser to said current source, and a milliammeter for measuring the current charge of said condenser; characterized by the fact that said polarity reversing switch comprises a pair of spring switch blades between opposed relatively rigid switch contacts, a shaft having means for engaging a movable element for rotation thereby, and means actuated by said shaft for moving said spring blades cyclically into engagement with their respective opposed contacts.

4. A direct-reading electrical tachometer of the type including a direct current source, a condenser, a polarity reversing switch for connecting said condenser to said current source, and a milliammeter for measuring the current charge of said condenser; characterized by the fact that said polarity reversing switch comprises a pair of spring switch blades between opposed relatively rigid switch contacts, a shaft having means for engaging a movable element for rotation thereby, means actuated by said shaft for moving said spring blades cyclically into engagement with their respective opposed contacts, and a tachometer head casing within which said switch means is mounted and said shaft is rotatably supported.

FREDERICK KESSLER FLOYD.

REFERENCES CITED

The following references are of record in the file of this patent:

UNITED STATES PATENTS

| Number | Name | Date |
|---|---|---|
| 1,665,857 | Needham | Apr. 10, 1928 |
| 1,779,783 | Sylvander et al. | Oct. 28, 1930 |
| 2,068,147 | Miller | Jan. 19, 1937 |
| 2,260,933 | Cooper | Oct. 28, 1941 |
| 2,314,874 | Eujen | Mar. 30, 1943 |
| 2,337,328 | Hathaway | Dec. 21, 1943 |

FOREIGN PATENTS

| Number | Country | Date |
|---|---|---|
| 557,248 | Great Britain | Nov. 11, 1943 |
| 627,819 | France | Oct. 13, 1927 |